United States Patent Office 3,100,410
Patented Aug. 13, 1963

3,100,410
CONTROL SYSTEMS
Leonard R. Hulls, Fort Washington, Pa., and Bjarne P. Jacobsen, Westport, Conn., assignors to Canadian Westinghouse Company, Limited, Hamilton, Ontario, Canada
Filed June 23, 1960, Ser. No. 38,357
Claims priority, application Canada June 27, 1959
7 Claims. (Cl. 80—56)

This invention is concerned with improvements in or relating to a control system, and more specifically to apparatus for controlling the operation of a machine device.

It is sometimes found with a control system that its output includes a periodic disturbance which occurs with a known periodic time, and which it is preferred should be eliminated, but it is found to be very difficult if not practically impossible to remove the source of the periodic disturbance, since this source is an essential component of the system being controlled.

This problem may become acute under two conditions. In the first the accuracy of control desired is of the same order of magnitude as the disturbance, at least during part of the operating period, and it is difficult, if not impossible, to remove the disturbance by simple filtering without removing the fast-changing part of the signal and reducing the response of the circuit to an undesired extent. In the second the periodicity of the disturbance varies over a comparatively wide range, e.g. in dependence upon the speed of the component producing the disturbance, and a reasonably simple filter is unable to deal adequately with such a wide range, causing a loss of response at some speeds. It may be noted that even if the periodic disturbance can be tolerated, it can have the disadvantage in a highly sensitive control system that it tends to cause unnecessary operation of the system with a resultant undesired increase in wear of many of the parts.

A specific example of such apparatus is a rolling mill in which material is reduced in thickness by passing it under tension between at least one pair of rolls which are forced together, the spacing between the rolls and the tension being adjusted to determine the output thickness of the rolled material. The material entering the mill generally will vary in thickness and other properties along its length and, as a result, unless compensation is made for these variations of the ingoing material, the outgoing material will also undesirably vary in thickness. In a method of correction that has been proposed in a copending patent application of Leonard R. Hulls, Serial No. 761,495, filed September 17, 1958, and assigned to the present assignee, the necessary compensation is made by controlling automatically the tension of the material passing between the rolls, and also the spacing between the rolls, in accordance with a signal that is proportional to the strain on the mill and therefore is proportional to the separating force that is established between the rolls.

As the rolls rotate with the material passing between them any eccentricity in either (or both) of the rolls will have the same effect on the control system as a periodic variation in the thickness of the material, the period of the variation being approximately that of the revolution of the rolls. As the rolls begin to rotate the period of the variation is relatively long and it decreases progressively to a minimum when the rolls are rotating at maximum speed. The period increases again as the rolls are decelerated from the maximum speed to rest. Even if simple filtering could be employed while the rolls are rotating at maximum speed, such filtering will not be adequate during the acceleration and deceleration intervals and the strip rolled during those intervals may be spoiled and defective. With modern high speed rolling mills the amount of spoiled strip may be considerable, and in one specific example may be as much as 400 feet.

Moreover, during the initial passes of the material through the mill there is no need for the output gauge to be controlled too accurately and its sensitivity will usually be too low for the periodic variation to affect the system. However, with subsequent passes, as the mill is set to give greater accuracy of rolling, the effect of the periodic disturbance will increase and the control system will begin to try to correct this seeming error in output thickness, causing unnecessary operation of the gauge controlling apparatus of the mill with resultant wear of the heavy moving parts. This effect is particularly noticeable in a control system as described in the above-mentioned copending patent application, since the measurement of the output gauge takes place at the nip of the rolls and the speed of response is high.

It is an object of the present invention to provide an improved control apparatus of the type described, wherein a control signal is provided that is substantially free of undesired disturbance caused components and further is less dependent upon the periodicity of that disturbance to thereby provide an improved response characteristic for the apparatus.

According to the present invention there is provided a control system comprising means for producing an electric control signal containing a periodic disturbance that is to be eliminated therefrom, and means sampling the electric signal over predetermined periods of time, averaging each sample and deriving from the averaged samples an electric control signal free of the periodic disturbance.

A specific embodiment of the invention, as applied to a rolling mill, will now be described by way of example with reference to the accompanying diagrammatic drawings, wherein.

Figure 1:
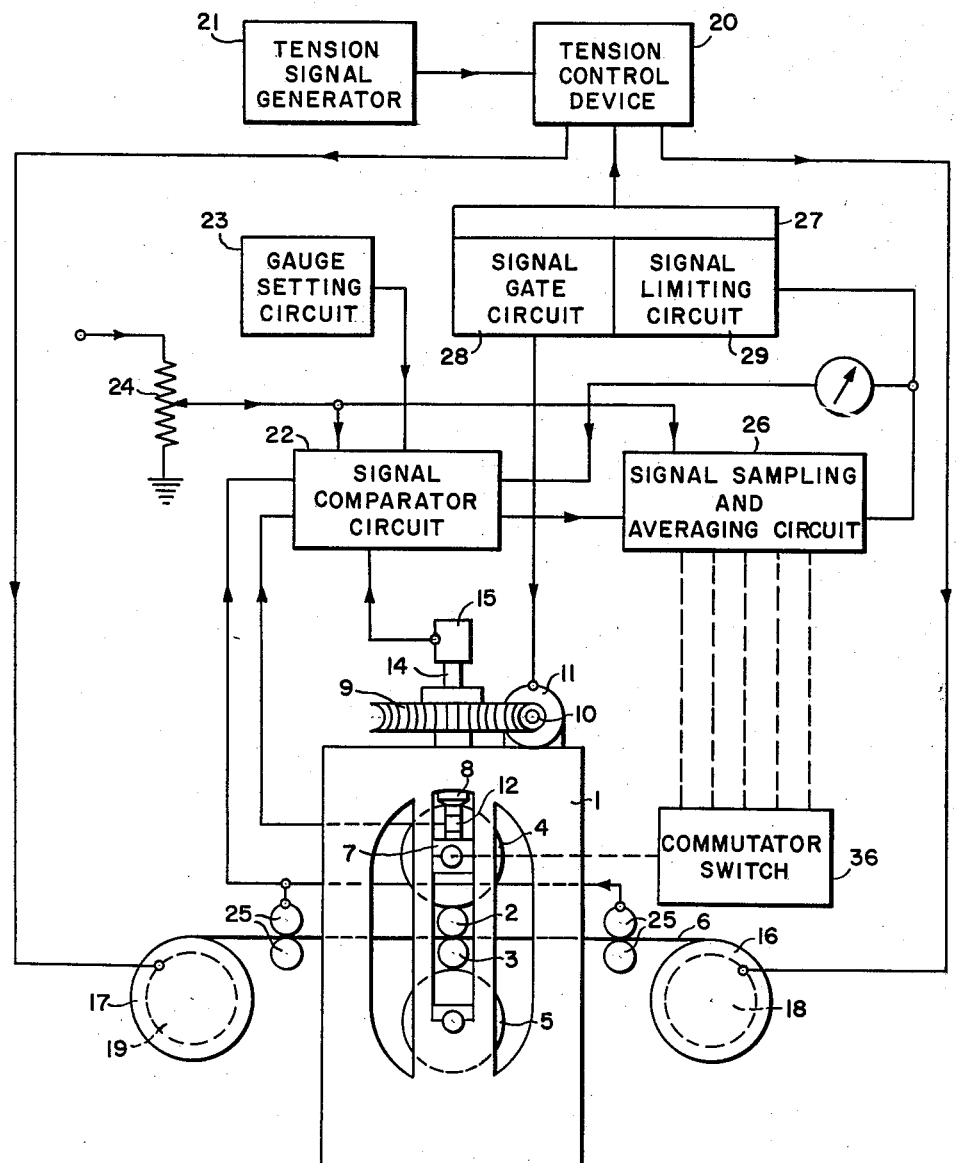
FIGURE 1 is a schematic representation of a single stand reversing rolling mill together with its associated electrical control equipment.

The rolling mill as illustrated in FIGURE 1 comprises a mill frame 1 in which are rotatably mounted a pair of opposed, material-engaging rolls 2 and 3 and a cooperating pair of back-up rolls 4 and 5, a strip 6 of material that is to be reduced in thickness passing between the opposed material-engaging surfaces of the rolls 2 and 3. The lower back-up roll 5 is mounted rigidly in the frame 1 for rotation about a fixed axis, while the upper back-up roll 4 is mounted for rotation by plummer blocks 7 (only one shown) the blocks being mounted between guides for vertical sliding movement in the frame 1. The blocks 7 are engaged by respective screws 8 which pass through corresponding screw-threaded bores in the frame 1, so that rotation of a respective pinion 9 mounted on the upper end of each screw causes the screw to move vertically relative to the frame. Rotation of each pinion 9 is effected by rotation of a respective worm gear 10 meshing with the pinion 9 and mounted on the shaft of a drive motor 11. A strain gauge 12 is provided for each screw 8 and measures the force of the screw 8 on its associated block 7 due to the separating force applied between the rolls 2 and 3 by the material passing through the mill. An extension shaft 14 is mounted on the upper face of each pinion 9 and drives a respective position generator 15 which produces an electric signal representative of the rotational position of the pinion, and hence representative of the separation setting of the rolls 2 and 3 without the material to be rolled between them.

It will be seen that any eccentricity in either of the rolls 4 and 5 will be transmitted respectively to the material-contacting rolls 2 and 3 and will have the same effect on the output of the strain gauge 12 as variations in the thickness of the metal strip 6, such variations occurring with a periodicity equal approximately to the time for one revolution of the back up rolls, which are usually of approximately the same diameter. In practice, despite very careful machining of the rolls it is impossible to eliminate all eccentricities owing, for example, to variations in the properties of the material from which the rolls were originally cast.

The back up roll 5 is rotated by an electric motor (not shown) coupled directly thereto, the speed of the motor being controlled to give full control of the speed of passage of the strip through the mill. The ingoing metal strip 6 is fed from a coil 16 through the rolls 2 and 3, the outgoing strip of reduced thickness being wound into another coil 17, with the direction of travel of the strip reversing after each pass through the mill as its thickness is progressively decreased. The reels 16 and 17 are mechanically coupled to respective electric motor/generators 18 and 19. As illustrated in FIGURE 1 the strip is passing from the reel 16 to the reel 17 and accordingly the motor/generator 19 serves as a motor and the motor/generator 18 serves as a drag-generator. The two motor/generators are controlled by a tension control device 20 to adjust the tension of the ingoing and the outgoing sides of the strip 6, so that the overall tension in the strip can be maintained at a selected value between limits which ensure that it will coil neatly and tightly without danger of breaking.

The control device 10 is in turn partly controlled by a tension reference signal generator 21 capable of manual setting by the mill operator to select the range of tension required for the gauge and type of strip that is being passed through the mill.

The signals derived from the strain gauges 12 and the position generators 15 are fed to a summation or signal comparator circuit 22, in which the signals are added in the proportions required to produce a signal representative of the actual spacing between the rolls 2 and 3 during operation of the mill and therefore representative of the thickness of the outgoing strip. Another electric signal which is representative of the desired average thickness of the strip is produced in a gauge setting circuit 23 and fed to the signal comparator circuit 22, this gauge setting circuit 23 also being adjustable manually by the mill operator. A further electric signal representative of the mill speed may be produced and fed to the summation or signal comparator circuit 22, with the circuit means for producing such a signal being indicated diagrammatically herein as a variably-tapped potentiometer 24. Usually suitable means will be provided for altering this signal automatically as the mill speed alters, but such means are not illustrated herein.

An overall control signal fed to the signal comparator circuit 22 is provided by a gauge monitor provided on the mill in order to check the correct operation of the control system, and also to give an indication of any permanent changes in the output thickness due, for example, to ambient temperature changes or ageing and/or malfunction of any of the individual system components. In this embodiment this gauge monitor is shown as two flying micrometers constituted by respective pairs of rolls 25, but any other thickness gauge, such as a radiation gauge, may also be used. Since the mill illustrated is a reversing mill two gauge monitors are required, one on each side of the mill, the gauge which is the output gauge being rendered effective by suitable direction sensitive switch devices or the like as required.

An electric error signal which is a resultant of all the signals fed to the summation or signal comparator circuit 22 is applied through a signal sampling and averaging circuit 26 whose operation will be described below, and thence through a control circuit 27 to the tension control device 20 and the screw motors 11. The control circuit 27 comprises a manually adjustable signal limiting circuit 29 and a manually adjustable signal gate circuit 28 whose operation also will be described below. In this regard it should be noted that suitable biased diode circuits are well known to persons skilled in this art for operation as a signal limiting circuit and as a signal gate circuit.

At the start of an operation on a fresh coil of strip the mill operator adjusts the gauge setting circuit 23 to indicate the gauge desired as a reference for the reduced strip after a single pass through the mill, and also adjusts the tension signal generator 21 to give approximately the required range of tension about a mean or reference value thereof, as dictated by his experience for the material and particular gauge to be rolled. The strip normally is subjected to a number of passes through the mill, and therefore there is no need for such close control of the output thickness during the initial passes as during the final passes. Accordingly, during the initial passes the operator sets the adjustable signal gate circuit 28 so that no correction is attempted in the roll spacing until the output thickness is in error by more than the amount set by the gate. It could also be arranged that the signal gate circuit 28 prevents any correction of thickness by a tension change until an appreciable error is present but, in practice, this is not done since the tension change is produced electrically and continuous operation of tension control can be tolerated. Also during the initial passes the signal limiting circuit 29 is so set that in the absence of the signal gate circuit 28 it would apply the error signal to cause operation simultaneously of both the tension control device 20 and the screw motors 11. The setting of the signal limiting circuit 29 can be altered as desired as the thickness of the strip material decreases until with the thinner strips the screw motors 11 are operated only if the maximum tension control is being applied and is unable to make the required correction to the thickness. The function of the signal gate circuit 28 and the signal limiting circuit 29 is therefore to prevent unnecessary operation of the slow acting roll spacing control and thereby prevent excessive wear of its components. This function is especially important during the final passes when in any case the roll spacing control is relatively ineffective in correcting the thickness of the thinner strips.

If the combined electric signals from the strain gauges 13, the position generators 15, the potentiometer 24 and the gauge monitor 25 do not correspond to the signal set by the gauge signal setting generator circuit 23 then an error signal is produced by the summation or signal comparator circuit 22 and is applied to cause operation of the tension control and the screw motors. As the output thickness is brought to the correct value, the error signal is reduced until it is no longer effective in this regard. As the thickness of the strip is reduced, the mill operator resets the adjustable signal gate circuit 28 between passes so that the thickness is corrected for a smaller error thereof until, during the final passes of the strip, the system is correcting the strip thickness to within the final desired limits. Also, as the thickness of the strip is reduced the signal limiting circuit 29 is reset, as described above.

The signals supplied from the summation or signal comparator circuit 22 to the signal sampling and averaging circuit 26 contain the periodic disturbance due to the eccentricity of the back-up rolls, as described above, and as the thickness of the strip is reduced and the signal gate circuit 28 is set for more accurate control of the mill, then this periodic disturbance becomes of the same order of magnitude as the error signal required to cause operation of the tension control unit and the screw motors.

The periodicity of this disturbance is so low that if it is attempted to remove this by simple filtering means, such means will also remove relatively slow variations in the error signal and accurate control of the mill will be lost. Since such a rolling mill deals normally with a strip in which variations in properties such as thickness take place relatively smoothly and continuously, and almost never in a highly random manner, then we are able to provide elimination of these disturbances by the signal sampling and averaging circuit 26 which will now be described in detail.

Figure 2:
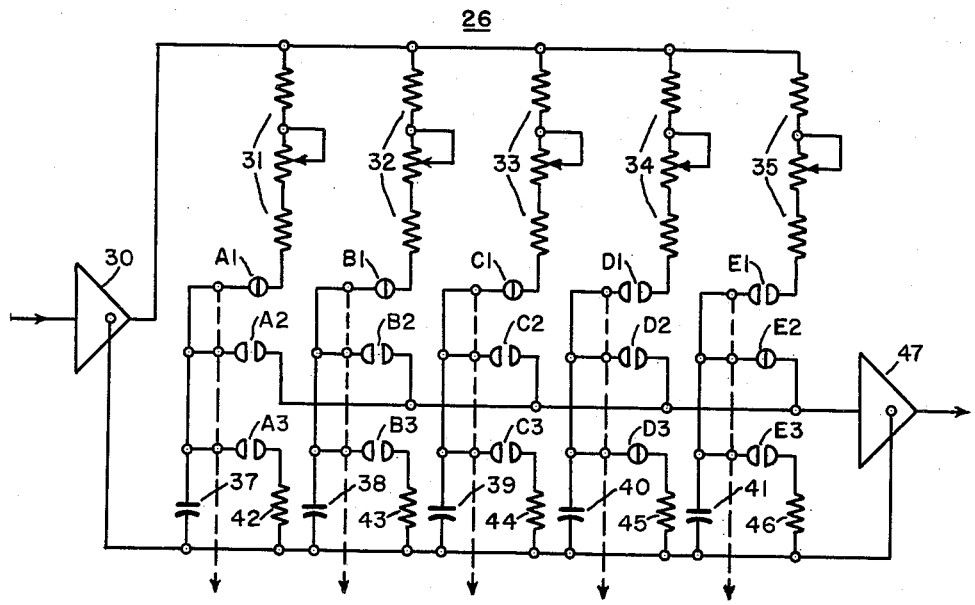
FIGURE 2 is a circuit diagram of an electrical control circuit 26 of FIGURE 1.

Referring now to FIGURE 2, the signal from the summation or signal comparator circuit 22 passes first to an amplifier 30 in which it is raised to an adequate level, and, if necessary, altered to a different form suitable for a subsequent operation it is to perform, for example, a signal fed from the circuit 22 may be an A.C. signal while it is desirable that it be transferred to a D.C. signal of appropriate magnitude. The signal is fed simultaneously to five banks of switch contacts A, B, C, D and E, each bank consisting of three pairs of contacts given the suffix 1, 2 and 3 respectively. The signal passes to each of the banks of switches through respective resistor networks 31 to 35, the networks permitting precise control of the magnitude of the signal fed to the respective switches. The banks of switches are operated by a commutator switch 36 (FIGURE 1) coupled directly to one of the back up rolls (in this embodiment the roll 4) through a suitable gear box (not shown) having a step down ratio of $n$ to $(n-2)$, in this embodiment 5 to 3, so that the operation of the switch banks A, B, C, D and E will be in the proper relation to the rotation of the back up rolls.

Figure 3:
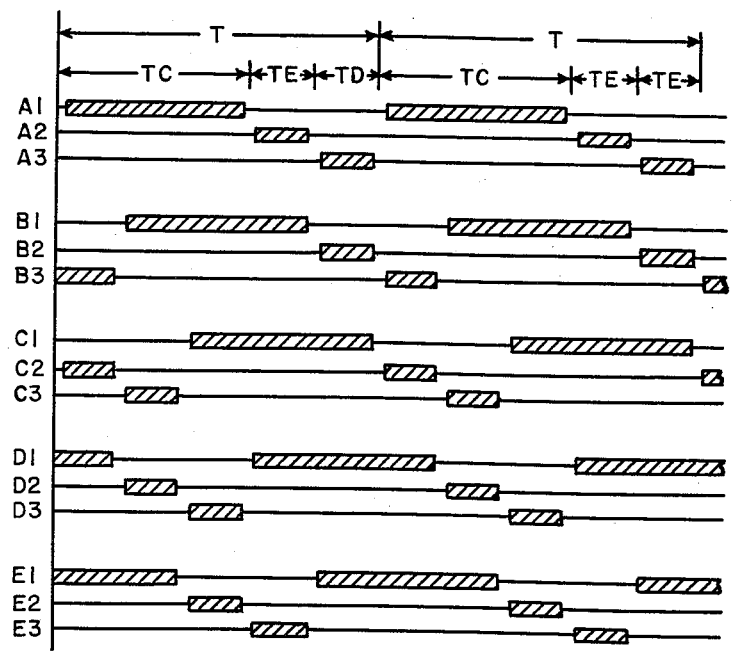
FIGURE 3 is a diagram showing the sequence of operation of sets of contacts of the circuit 26 in FIGURE 2.

The operation of each switch can be seen from FIGURE 3, the relatively thick shaded areas indicating the times during which the switches are closed, and the relatively thin lines indicating the times during which the switches are open. During a time period T equal to one and two-thirds revolutions of the back up roll each switch 1 is closed for a period TC, each switch 2 is closed for a period TE, and each switch 3 is closed for a period TD. The periods TC, TE and TD for each bank of switches are successive and together add up approximately to the time period T, or one revolution of the commutator switch 36. The periods TE and TD are approximately equal to one another and are equal to a whole number fraction $$\frac{1}{n-2}$$

of the period TC, where $n$ is the number of switch banks.

At the instant represented by FIGURE 2 the switches A1, B1, C1, D3 and E2 are closed. The result is that at this instant capacitors 37, 38 and 39 are being charged with signals derived from the amplifier 30 via the respective resistor banks 31, 32 and 33, while a capacitor 41 that has previously been charged through its resistor bank 35 is now discharging via the switch E2 to an amplifier 47, and a capacitor 40 which was previously charged via its resistor bank 34 and has already supplied a signal to the amplifier 47 via now open switch D2 now has its switch D3 closed and is discharging itself completely via a resistor 45.

At another instant, later than the first by the interval TE or TD the switches A2, B1, C1, D1 and E3 are closed, and so on through the combinations A3, B2, C1, D1 and E1; A1, B3, C2, D1 and E1; and A1, B1, C3, D2 and E1 until A1, B1, C1, D3 and E2 is again obtained. Therefore at any instant three of the capacitors 37 to 41 are being charged, one is supplying a signal to the amplifier 47, and one is being completely discharged via its respective one of the resistors 42 to 46. If the thick lines representing the periods TE of the five switch banks are projected on to the same line, the resultant line will be found to be substantially continuous, indicating that at all times a signal is being fed to the amplifier 47. It will be noted however that the line is not completely continuous, a distinct gap being provided between each period to ensure that there is no possibility of two of the second switches being closed at the same time.

Considering a single capacitor and its associated bank of switches, at the beginning of the period T the capacitor has been discharged to a predetermined level which is the same for all the capacitors. During the period TC, which is of length ⅗ T and equal to one revolution of the back up roll 4, the capacitor is charged to a level dependent upon the value of the charging signal integrated over that period. During TE, as described above, a signal derived from the capacitor is fed to the amplifier 47, the discharge impedance presented by the amplifier being sufficiently high, and the capacitor being sufficiently large, to ensure that the signal is substantially constant over that period. During the period TD the capacitor discharges to the said predetermined value, and thereafter begins to charge again in the subsequent period TC.

It will be seen that by use of the signal sampling and averaging circuit 26 periodic disturbances in the signal fed to the circuit 26 are not permitted to pass to the remainder of the control circuit apparatus, although they will have an affect in changing the general level of the steady signal supplied by the circuit 26 to the remainder of the control circuit apparatus. Less abrupt changes in the error signal fed to the circuit 26 will also be effective, in that they will cause a progressive change in the output signal until a level is reached at which the control circuit apparatus will operate to make the necessary corrections in tension, and perhaps also in roll spacing.

Although in this embodiment the sampling and averaging is effected for a period TC corresponding to a whole revolution of one of the rolls 4 and 5, in other readily apparent embodiments the length of this period could be made to correspond to other suitable and desired fractions of a revolution. Theoretically this fraction should be as small as practicable, so that the number of sampling periods is as large as as feasible, but in practice the smallest number of sampling periods that will give the desired accuracy will be employed.

Moreover, although in this embodiment the signal sampling and averaging circuit 26 takes the form of a number of capacitors whose charging and discharging are controlled in a particular manner by banks of switches, in other embodiments the device may take other forms. For example, another form of the device employs operational amplifiers, each with negative capacitive feedback, as electrical integrating elements. If an electromechanical integrating element is required this can be a motor driven potentiometer, while a wholly mechanical integrating element is, for example, any form of controllable infinitely variable gear device rotating a shaft.

We claim:

1. In apparatus for controlling the operation of a machine device, the combination of error signal means operative with said machine device for producing an error signal containing a periodic disturbance in accordance with the operation of said machine device, signal sampling means operative with said error signal means for sampling said error signal at predetermined periods of time, signal averaging means operative with said signal sampling means to average each sample of said error signal for deriving from each of the latter samples a control signal substantially free of said periodic disturbance, and a control member operative with said machine device and responsive to said control signal for controlling the operation of said machine device.

2. In apparatus for controlling the operation of a machine device having at least one rotating element, the combination of error signal means operative with said machine device for providing an error signal containing a periodic disturbance substantially in synchronism with the rotation of said element and in accordance with the operation of said machine device, signal sampling and averaging means operative with said error signal means and responsive to the rotation of said element for sampling said error signal in accordance with said rotation and integrally averaging each sample of said error signal for deriving a control signal substantially free of said disturbance, and control means operative with said machine device and responsive to said control signal for controlling the operation of said machine device.

3. In apparatus for controlling the operation of a machine device, the combination of error signal means operative with said machine device for providing an error signal containing a periodic disturbance in accordance with the operation of said machine device, a plurality of capacitors, signal sampling means including switching means operative with said machine device for connecting each of said capacitors to said error signal means to receive a sample of said error signal over a period of time determined by the operation of said machine device whereby each capacitor is charged by said error signal to an average level, said switching means being further operative to derive from said capacitors a control signal in accordance with said average level of charge and substantially free of said periodic disturbance, and control means operative with said machine device and responsive to said control signal for controlling the operation of said machine device.

4. In apparatus for controlling the operation of a machine device having an operational cycle, the combination of error signal means operative with said machine device for producing an error signal containing a periodic disturbance in accordance with the operation of said machine device, signal sampling means operative with said error signal means for sampling said error signal at predetermined periods of time, with each of said periods being a predetermined portion of said operational cycle, signal integration means operative with said signal sampling means to integrate each sample of said error signal for deriving from each of the latter samples a control signal substantially free of said periodic disturbance, and a control member operative with said machine device for a predetermined portion of said operational cycle and responsive to said control signal for controlling the operation of said machine device.

5. In apparatus for controlling the operation of a machine device having a rotating element, the combination of error signal means operative with said machine device for providing an error signal containing a periodic disturbance related to the rotation of said element and in accordance with the operation of said machine device, signal sampling and integration means operative with said error signal means and responsive to the rotation of said element for sampling said error signal in a predetermined relationship to said rotation and being operative to integrate each sample of said error signal for deriving a control signal substantially free of said disturbance, and control means operative with said machine device as a function of said rotation and responsive to said control signal for controlling the operation of said machine device.

6. In apparatus for controlling the operation of a rolling mill having roll members, the combination of error signal means operative with at least one of said roll members for providing an error signal containing a periodic disturbance in accordance with the operation of said rolling mill, a plurality of capacitors, signal sampling means including switching means operative with said rolling mill for connecting each of said capacitors to said error signal means to receive a sample of said error signal over a predetermined first period of time related to the operation of said rolling mill whereby each capacitor is charged by said error signal to an average level, signal averaging means being operative to derive from said capacitors a control signal in accordance with said average level of charge and substantially free of said periodic disturbance, and control means operative with said rolling mill and responsive to said control signal for controlling the operation of said rolling mill.

7. In apparatus for controlling the operation of a rolling mill having rolls between which the material to be rolled passes, the combination of signal means operative with said rolling mill for providing a control signal in accordance with the roll separating force applied by the material passing through the mill to said rolls and further in accordance with the separation setting of said rolls, mill control means responsive to said control signal for controlling the tension of said material relative to said rolling mill and for controlling said separation setting, signal sampling means operative with at least one of said rolls for sampling said control signal as a predetermined function of the rotation of said one roll, and signal integration means operative with said signal sampling means to integrate and thereby average each sample of said control signal for deriving a correction signal, with said mill control means being responsive to said correction signal.

References Cited in the file of this patent

UNITED STATES PATENTS

| | | |
|---|---|---|
| 2,264,096 | Mohler | Nov. 25, 1941 |
| 2,586,412 | Winchester | Feb. 19, 1952 |
| 2,710,934 | Senn | June 14, 1955 |
| 2,883,895 | Vossberg | Apr. 28, 1959 |
| 2,933,626 | Giboney et al. | Apr. 19, 1960 |
| 2,962,166 | Miles et al. | Nov. 29, 1960 |
| 2,999,406 | Warren | Sept. 12, 1961 |
| 3,000,003 | Einsel | Sept. 12, 1961 |

FOREIGN PATENTS

| | | |
|---|---|---|
| 1,224,057 | France | Feb. 8, 1960 |

OTHER REFERENCES

Control Engineering, October 1957, pages 74–80.